(No Model.)
L. LA VECK.
HORSESHOE.
No. 516,494.  Patented Mar. 13, 1894.
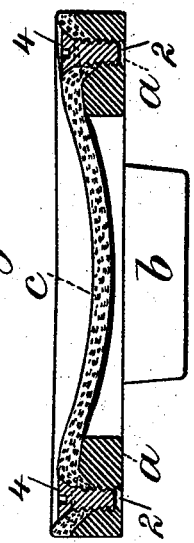
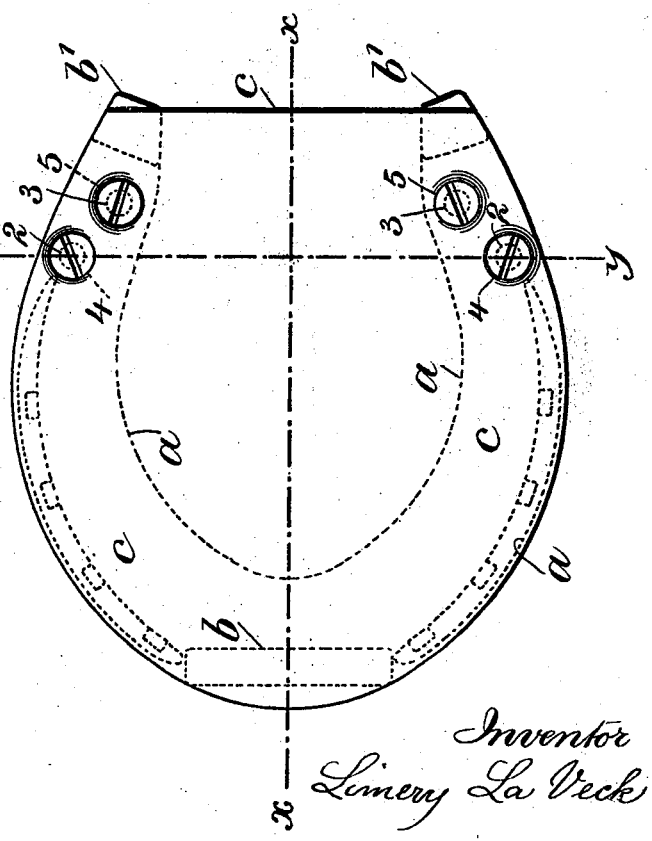
Witnesses
Chas H Smith
J Stail
Inventor
Limery La Veck
per Lemuel W Serrell
Atty.

UNITED STATES PATENT OFFICE.

LIMERY LA VECK, OF NEW YORK, N. Y.

HORSESHOE.

SPECIFICATION forming part of Letters Patent No. 516,494, dated March 13, 1894.

Application filed April 12, 1893. Serial No. 470,042. (No model.)

*To all whom it may concern:*

Be it known that I, LIMERY LA VECK, a citizen of the United States, residing in the city, county, and State of New York, have invented a new and useful Improvement in Horseshoes, of which the following is declared to be a full and exact description.

My invention relates especially to shoes for horses used in cities and subjected to travel over cobble-stones and other stone pavements and more particularly to shoes having calks to prevent slipping and provide for a sure footing in drawing heavy loads.

Shoes for horses have heretofore been made with a lining of leather, rubber, or other similar material connected thereto so as to protect the sensitive frog of the horse's hoof from contact with stone pavements that tend to injure the same. In these instances the rubber or leather has been so connected to the shoe as not to be readily detached and the shoes had to be different from the ordinary shoes and were expensive to make because of the additions necessary for connecting the leather or rubber to the shoe. In my improvement no changes in the shoe are necessary and the leather or rubber lining is readily attached and detached, and in carrying out my invention I make counter-sinks and screwholes in the shoe near its respective back ends and the leather or rubber lining is connected directly to the shoe by screws that pass down through said lining into the screw-holes, and the screw heads carry the lining down into the countersinks and their upper ends are flush with or slightly below the surface of the lining and do not come in contact with the hoof of the animal, and these attaching screws are covered and out of the way, so that they are not injured by use and can be removed with facility for applying another lining or to allow for heating the shoe in sharpening the calks or shaping the shoe. The usual nails that hold the shoe to the hoof usually pass through the leather lining. The lining is thus held at the front and sides of the hoof and at the back ends by the screws, and when the shoe is removed from the hoof by withdrawing the nails the leather lining is freed except at said screws which are readily removed, as the heads have been protected from injury.

In the drawings, Figure 1 is a plan view illustrating my improvement. Fig. 2 is a longitudinal section at the line $x—x$ of Fig. 1, and Fig. 3 is a cross section of the same at the line $y—y$ of Figs. 1 and 2.

The horse-shoe $a$ is of usual construction and preferably provided with a front calk $b$ and back calks $b'$ and is made to conform to the shape of the horse's hoof, and as usual is provided with nail holes around the front portion. Near each of the back ends and adjacent to the back calks $b'$ are countersinks in the upper surface of the shoe and screw threaded holes 2 and 3 for the screws 4 and 5. I prefer to employ two screws and screw holes at each of the back ends of the shoe.

$c$ represents the leather lining which comes between the shoe and hoof and is at first preferably slightly larger than the shoe to be trimmed down when in place. The screws 4 and 5 at the respective back ends of the shoe pass through the leather lining and into the screw-holes of the shoe in connecting the lining and shoe at the back of the shoe, and said screws carry the leather lining down into the countersinks of the shoe and the heads of the screws become countersunk in the leather so that their faces are flush with or below the surface and do not come in contact with the animal's hoof, besides the screws are covered and out of the way and are not injured with the use and wear of the shoe and can be easily removed. The usual nails pass through holes in the forward part of the shoe, through the leather lining and into the hoof to secure both shoe and lining in place on the hoof, and the leather lining plate extends over the frog and protects the same from injury. To re-shape the shoe and renew or sharpen the calks the shoe is easily removed from the hoof by withdrawing the nails in the ordinary manner, and when taken off the lining and shoe are quickly separated by removing the screws and said parts can be readily reconnected or a new leather lining put in place.

My improvement is very simple and inexpensive and can be applied to any ordinary shoe.

I claim as my invention—

The metallic horseshoe having screw-holes near its respective ends with countersinks in the upper surface of the shoe, in combination with the lining of leather or equivalent material resting upon the shoe, and screws passing through the lining into the holes in the shoe, whereby the lining is pressed into the countersinks and the heads of the screws are recessed or countersunk in the lining with their faces flush therewith or nearly so, substantially as specified.

Signed by me this 8th day of April, A. D. 1893.

LIMERY LA VECK.

Witnesses:
GEO. T. PINCKNEY,
A. M. OLIVER.